United States Patent
Reckziegel et al.

(10) Patent No.: US 12,196,043 B2
(45) Date of Patent: Jan. 14, 2025

(54) RIGID RISER SUPPORT AUTOMATION

(71) Applicant: PETRÓLEO BRASILEIRO S.A.—PETROBRAS, Rio de Janeiro (BR)

(72) Inventors: Gilnei Reckziegel, Rio de Janeiro (BR); Francisco Francelino Ramos Neto, Rio de Janeiro (BR); Jorge Gomes de Melo Medeiros, Rio de Janeiro (BR); Claudio Violante Ferreira, Rio de Janeiro (BR); Bruno Pinho Dos Reis, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 18/682,880

(22) PCT Filed: Sep. 1, 2022

(86) PCT No.: PCT/BR2022/050349
§ 371 (c)(1),
(2) Date: Feb. 9, 2024

(87) PCT Pub. No.: WO2023/028682
PCT Pub. Date: Mar. 9, 2023

(65) Prior Publication Data
US 2024/0344403 A1    Oct. 17, 2024

(30) Foreign Application Priority Data
Sep. 1, 2021  (BR) .......................... 1020210173610

(51) Int. Cl.
*E21B 17/01* (2006.01)
*F16L 37/086* (2006.01)
*F16L 37/092* (2006.01)

(52) U.S. Cl.
CPC ............ *E21B 17/01* (2013.01); *F16L 37/086* (2013.01); *F16L 37/092* (2013.01)

(58) Field of Classification Search
CPC ........ E21B 17/01; E21B 19/004; E21B 19/06; E21B 19/07; E21B 19/10
See application file for complete search history.

(56) References Cited

U.S. PATENT DOCUMENTS 3,342,520 A * 9/1967 Haynes .................. E21B 19/07
  294/90
3,490,792 A   1/1970 Piegza
(Continued)

FOREIGN PATENT DOCUMENTS

BR    PI0902469 A2   4/2011
BR   102020010231 A2  11/2021
(Continued)

OTHER PUBLICATIONS

English translation of the International Search Report dated Dec. 12, 2022, in connection with Int'l Appln No. PCT/BR2022/050349 (3 pages).

*Primary Examiner* — Matthew R Buck
(74) *Attorney, Agent, or Firm* — McCarter & English, LLP

(57) ABSTRACT

Disclosed is a mechanism for retracting the wedges of a rigid riser support, consisting of a cam holder crown, rods with rollers, a drive spindle, a hydraulic actuator and springs; this system can be driven by ROV or remotely. The system allows the reduction of the need for shallow diving and enables interconnections of rigid risers by keelhauling, promoting competitiveness with the flexible riser solution.

7 Claims, 8 Drawing Sheets

(56) References Cited

U.S. PATENT DOCUMENTS

| | | | | |
|---|---|---|---|---|
| 3,742,562 A | * | 7/1973 | Haby | ............... E21B 19/07 |
| | | | | 188/67 |
| 8,240,391 B2 | * | 8/2012 | Bouligny, Jr. | .......... E21B 19/07 |
| | | | | 166/382 |
| 2012/0070225 A1 | * | 3/2012 | Wallace | ............... E21B 19/006 |
| | | | | 403/315 |
| 2015/0337607 A1 | | 11/2015 | Latimer et al. | |
| 2018/0313172 A1 | | 11/2018 | Smits et al. | |

FOREIGN PATENT DOCUMENTS

| | | |
|---|---|---|
| WO | 2006/041904 A1 | 4/2006 |
| WO | 2010/029322 A2 | 3/2010 |
| WO | 2014/179732 A2 | 11/2014 |
| WO | 2017/034409 A1 | 3/2017 |

\* cited by examiner (a)          (b)

RIGID RISER SUPPORT AUTOMATION

RELATED APPLICATIONS

The present application is a U.S. National Phase Application under 35 U.S.C. 371 of International Application No. PCT/BR2022/050349 filed on Sep. 1, 2022, which claims the benefit of Brazilian Patent Application No. BR 10 2021 017361 0 filed on Sep. 1, 2021, the entire disclosures of which are expressly incorporated by reference herein.

FIELD OF THE INVENTION

The present invention is based on a concept of a riser traction support system applied to a SPU. The mechanism of the invention can make it possible to reduce the need for shallow diving in rigid riser interconnections, promoting competitiveness with the flexible riser solution.

DESCRIPTION OF THE STATE OF THE ART

The MB (Multifunctional Bellmouth—PI 0902469-7), is the base concept established for a new riser support device, developed by Petrobras, which should present the versatility of allowing the use of flexible or rigid risers, and interconnection can be carried out on the port or starboard side of the SPU.

Particularly in the case of supporting rigid risers, the MB can be considered as a first approach of tube support, where the top termination of the riser, commonly called Hang-Off Adapter (HOA), contains a flexible joint or stress joint attached to its lower part. The traction of the riser is anchored in the upper cone of the MB, with this force being transmitted by wedges that, in the initial development stage of the MB concept, would be installed by shallow diving. The lateral forces arising from the riser would be supported by a locking ring located at the lower part of the support tube.

An automation mechanism for rigid riser support will be presented in this invention, in order to increase the level of safety and reliability in underwater pull-in and pull-out operations, reducing shallow diving activities, which are of high dangerousness.

Particularly for the pull-out operation, in the original rigid riser support (BR 10 2020 010231-1), a concept of a wedge retraction mechanism (8) was developed, shown in FIG. 1. The basis of this concept is on the bars (7) that interconnect all the wedges (8) of the upper cone (9), meaning that the assembled structure has only one degree of freedom: that of joint retraction of all the wedges. By driving the actuator, which is connected to a wedge via a rod, all wedges move simultaneously. By retracting the wedges, it is possible to remove the Hang-Off Adapter (HOA) from the support tube. The system does not eliminate diving operation during the pull-in preparation activities as cleaning and testing of the wedge system are required.

Document US2012070225A1 discloses a connector assembly that can be used to connect a tension ring to a telescopic joint in a riser by using of a lower configuration of hydraulically actuated dogs. A set of hydraulically actuated hang-off dogs on the connector assembly can be used to connect the tension ring to a diverter housing mounted on a rig. To prevent accidental disengagement of the hang-off dogs, a hydraulically actuated lock ring is used to provide a positive stop against the back of the hang-off dogs.

Document WO2017034409A1 discloses a system for locking a riser to a support tube on a floating platform. A support tube is installed through a structural connection to the hull of a floating unit. The locking system has six hinges distributed around the periphery of the support tube. The support tube has a collar that is secured by the hinges when said hinges are in the locking position.

Document WO2014179732A2 discloses a tool used to fix the end of top risers. The tool has a base and a ring that is movable relative to the base, and has a plurality of couplings, wherein each coupling has a groove. The tool further includes lugs configured to secure the tool to an upper unit via cables. An actuator is arranged between the base and the ring. The ring is movable relative to the base as the actuator moves between an extended position and a retracted position. The actuator may be a hydraulic cylinder, a pneumatic cylinder, a motor or other driving device of the state of the art. The tool includes fastening members pivotally connected to the base via a support member and a pin. The fastening member is configured to rotate about the pin as the ring moves relative to the base.

The presented documents of prior art are devices capable of fixing the upper end of the top riser to a production unit; however, they do not eliminate diving activity.

In face of the difficulties present in the abovementioned State of the Art, in particular for solutions for automation of rigid riser support, there is a need of developing a technology capable of acting effectively and in accordance with environmental and safety guidelines. The mentioned documents of prior art do not have the unique features of this invention, which will be presented in detail below.

OBJECTIVE OF THE INVENTION

It is an objective of the invention to provide a mechanism for automating the support of rigid risers, to carry out pull-in and pull-out activities.

BRIEF DESCRIPTION OF THE INVENTION

This invention presents a mechanism for retracting the wedges (8) of a rigid riser support (FIG. 2), consisting of a cone (9), a cam holder crown (1), rods (6) with rollers (4), a drive spindle (2), and springs (5), and this system can be operated remotely through the hydraulic actuator (3), or driven locally by ROV, thus eliminating the need for diving.

BRIEF DESCRIPTION OF THE DRAWINGS

The present invention will be described in more detail below, with reference to the attached figures that, in a schematic way and not limiting the inventive scope, represent examples of its embodiment. In the drawings, there are.

DETAILED DESCRIPTION OF THE INVENTION

There follows below a detailed description of a preferred embodiment of the present invention, which is exemplary and in no way limiting. However, it will be clear to a technician skilled on the subject, upon reading the description, possible additional embodiments of the present invention still comprised by its essential and optional features below.

Figure 1:
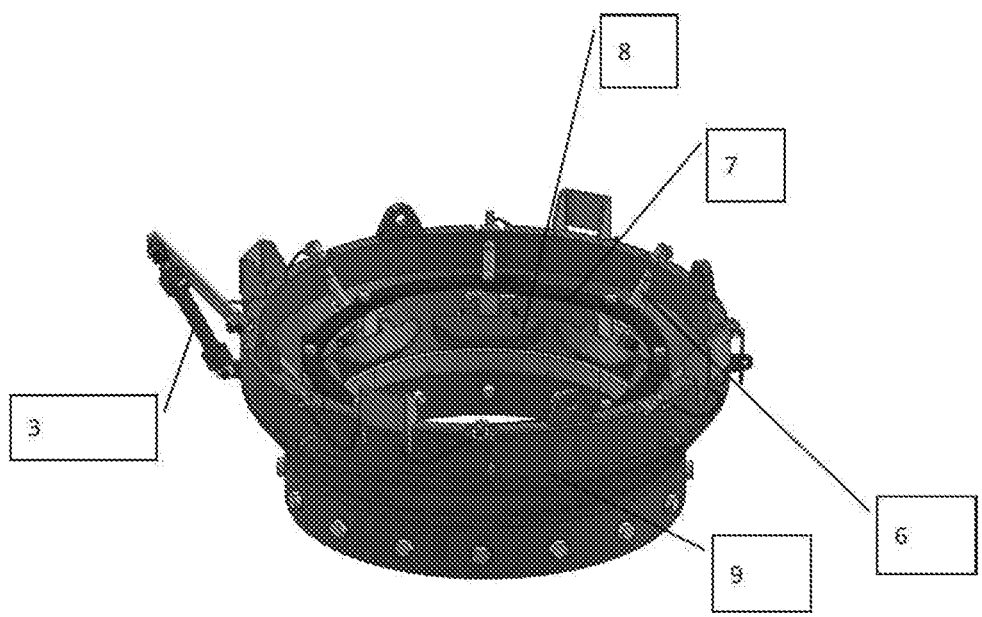
FIG. 1, which illustrates the support concept of Hang-Off Adapter (HOA) developed by Petrobras, where there are indicated: actuator (3), rod (6), mechanism bar (7), wedges (8), and cone (9)
Figure 2:
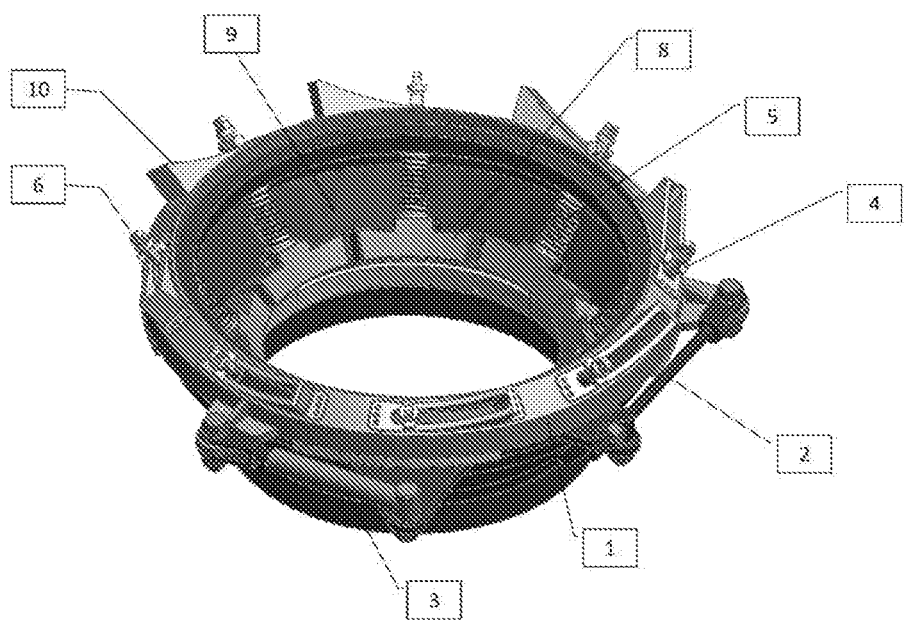
FIG. 2, which illustrates an overview of the automated retraction mechanism of the wedges installed in the upper cone of the support tube, where there are indicated: cam holder crown (1), drive spindle (2), hydraulic actuator (3), rollers (4), springs (5), rods (6), wedges (8), cone (9), and cams (10)

In the system of the present invention, the mechanism for retracting the wedges (8) of a rigid riser support (FIG. 2) consists of a cam holder crown (1), rods (6) with rollers (4), a drive spindle (2), and springs (5), and this system can be driven by ROV, thus eliminating the need for diving. The drive spindle (2) can also be replaced by a hydraulic actuator, which can be operated by a panel installed on the SPU itself, also eliminating the need for an ROV for activities of driving the support. The system makes it possible to move the wedges remotely during the pull-in and pull-out operations. It is also possible to use the system in the preparation phase for pull-in, as it allows the driving for testing and cleaning of the handling surfaces. FIG. 2 shows the concept overview of the new mechanism.

The main components of the automated retraction mechanism of the wedges will be described below.

Cam holder crown (1): component responsible for moving the wedges (8). When driven by the spindle (2), the crown (1) rotates around its axis, thus simultaneously moving all the rods (6) through the rollers (4) following the cams (10). The geometry of the cams was defined so that, at the beginning of the crown rotation movement, the force exerted on the rods (6) is larger, in order to avoid possible locking of the wedges in the working position. After the movement begins, the force required to move the wedges is expected to be progressively smaller.

Drive spindle (2): component driven by ROV through a suitable interface, which transmits to the crown (1) the torque necessary for its rotation and consequent movement of the wedge system. This component can only be mounted when there is a need to drive the system by ROV.

Hydraulic actuator (3): responsible for transmitting to the crown (1) the torque necessary for its rotation and consequent movement of the wedge system (8). This actuator enables remote driving, via a panel in the SPU, of the locking system.

Rollers (4): components installed on the rods (6) that follow the cams (10) mounted on the crown. This component transfers the rotational movement of the crown (1) to the translational movement of the rods (6), which in turn move the wedges.

Springs (5): help return the wedges to the working position, in case there are deposits of marine life that prevent return by gravity.

Rods (6): transfer the translational movement to the wedges.

Next, the operation of the automated retraction mechanism of the wedges will be described.

Figure 3:
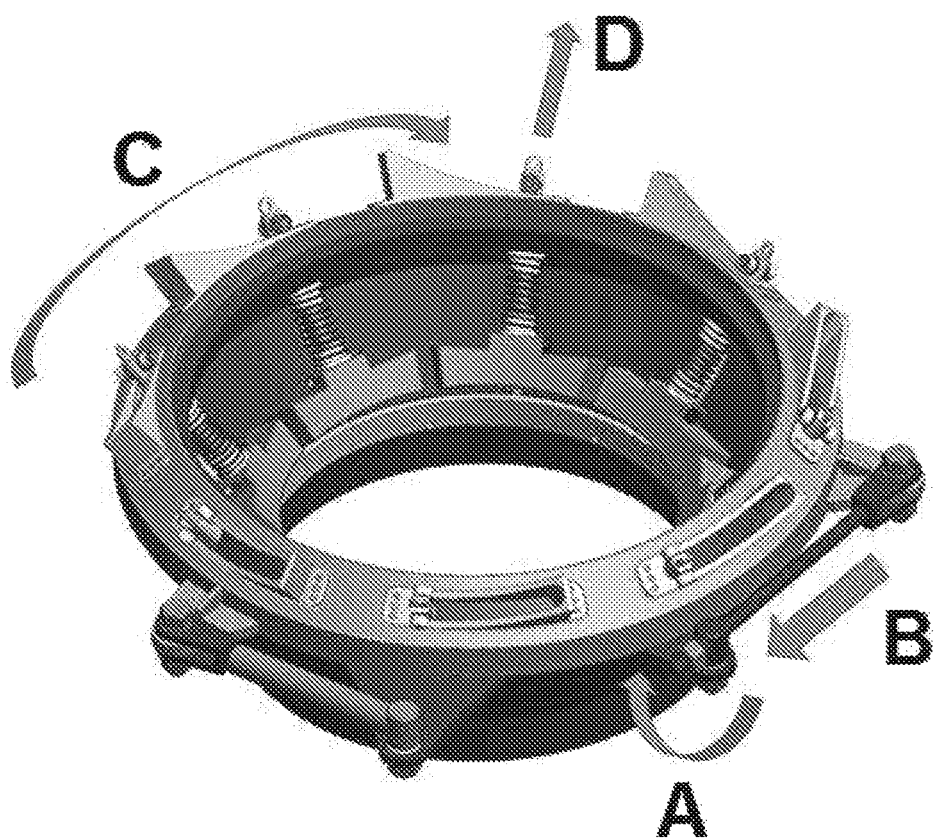
FIG. 3, which illustrates the automated retraction mechanism of the wedges operated by ROV.

There are two modes of actuation of the mechanism: remotely, through the hydraulic actuator (3) driven by a panel installed in the SPU (FIG. 4), or through a spindle (2) driven locally by ROV (FIG. 3). When the driving is done through the hydraulic actuator (3), it is necessary that the spindle (2) is not mounted, as this would lock the system. In the case of the driving by the spindle (2), the hydraulic actuator (3) may be mounted, since the hydraulic circuit can be depressurized remotely, meaning that the actuator (3) does not lock the mechanism.

In ROV driving mode, for system operation, it is necessary to assemble and actuate the spindle (2) with the aid of ROV through a suitable interface at Point A, as shown in FIG. 3. With the driving of the spindle (2), the torque is transferred to the cam holder crown (1), which in turn rotates clockwise around its longitudinal axis, as indicated by Point C. Through the cams (10) mounted on the crown (1), the rotation is transferred to the translation of the rods (6) by the movement of the rollers (4) on the cams (10), as indicated by Point D. By driving the rods (6), the wedges open (8), unlocking the HOA (Hang-Off Adapter).

Figure 4:
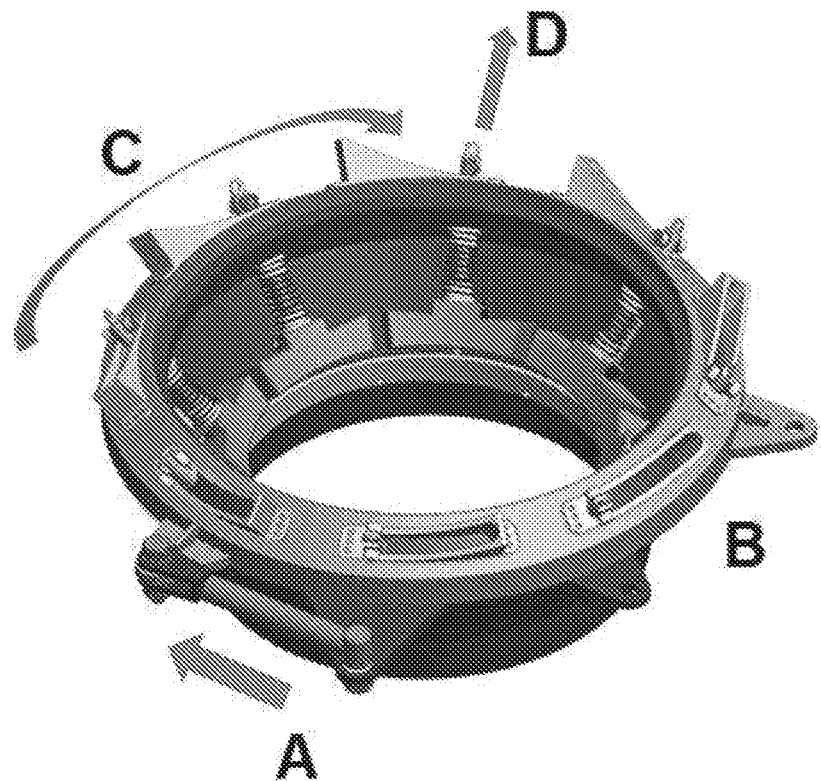
FIG. 4, which illustrates the automated retraction mechanism of the wedges by hydraulic drive.

In the hydraulic actuator drive mode, for the system to operate, it is necessary to pressurize the hydraulic cylinder (3) indicated at Point A, as shown in FIG. 4. In this mode of operation, the spindle (2) is not mounted, as shown by Point B. With the translational movement of the actuator (3), the torque is transferred to the cam holder crown (1), which in turn rotates clockwise around its longitudinal axis, as indicated by Point C. Through the cams (10) mounted on the crown, the rotation is transferred to the translation of the rods (6), by the movement of the rollers (4) on the cams (10), as indicated by Point D. With the driving of the rods (6), the wedges (8) open, unlocking the HOA.

The present invention is capable of providing economic and productivity advantages, making it possible to reduce the time to start oil production and the waiting time for vessels for pull-in activities. Another advantage is related to health and safety, which is achieved by eliminating shallow diving activities during rigid riser pull-in and pull-out operations. Finally, the system of this invention (remotely driven cam holder crown) allows testing and cleaning of wedges before pull-in, increasing the reliability of the operation.

Figure 5:
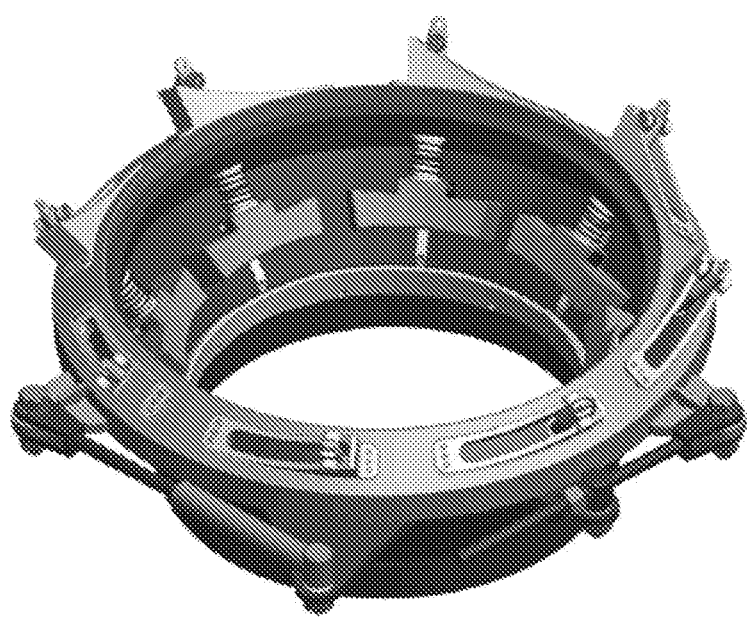
FIG. 5, which illustrates the system with the wedges retracted for testing and cleaning, in pull-in operation.
Figure 6:
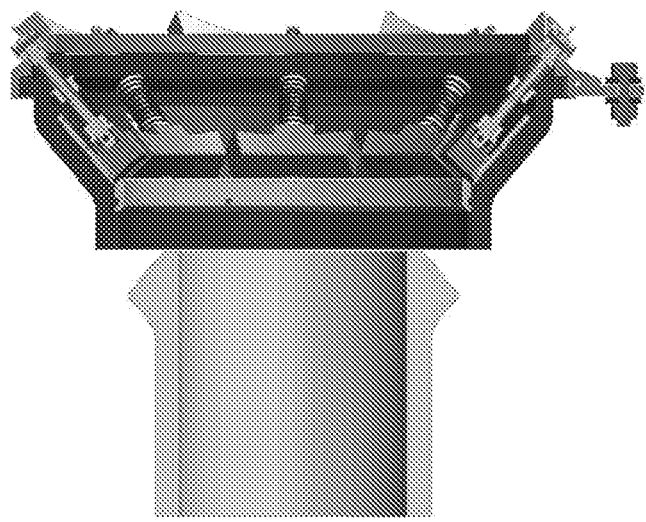
FIG. 6, which illustrates the HOA being pulled through the cone by the pull-in cable. The wedge system is in the closed position.
Figure 7:
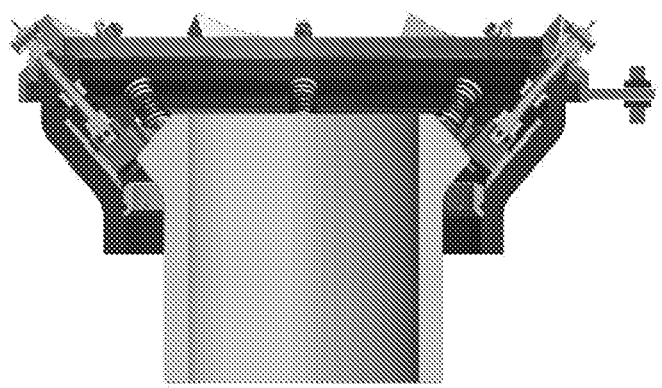
FIG. 7, which illustrates the HOA driving the wedges during passing through the cone, in pull-in operation.
Figure 7:
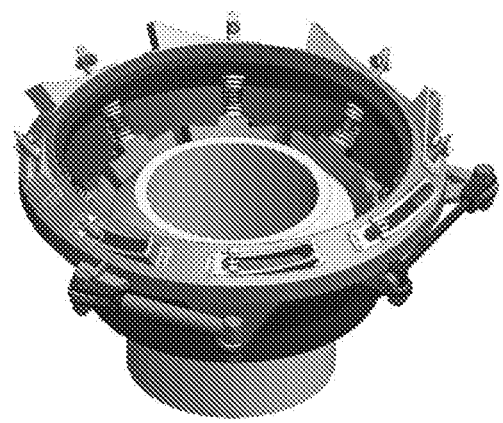
Figure 8:
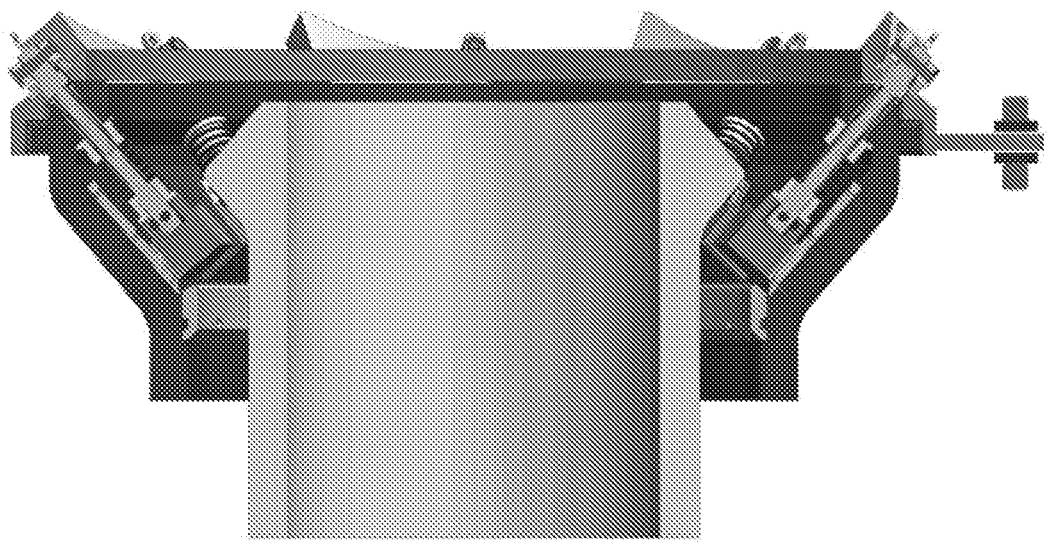
FIG. 8, which illustrates the wedges returning by gravity and spring effect to the closed position, in pull-in operation.
Figure 9:
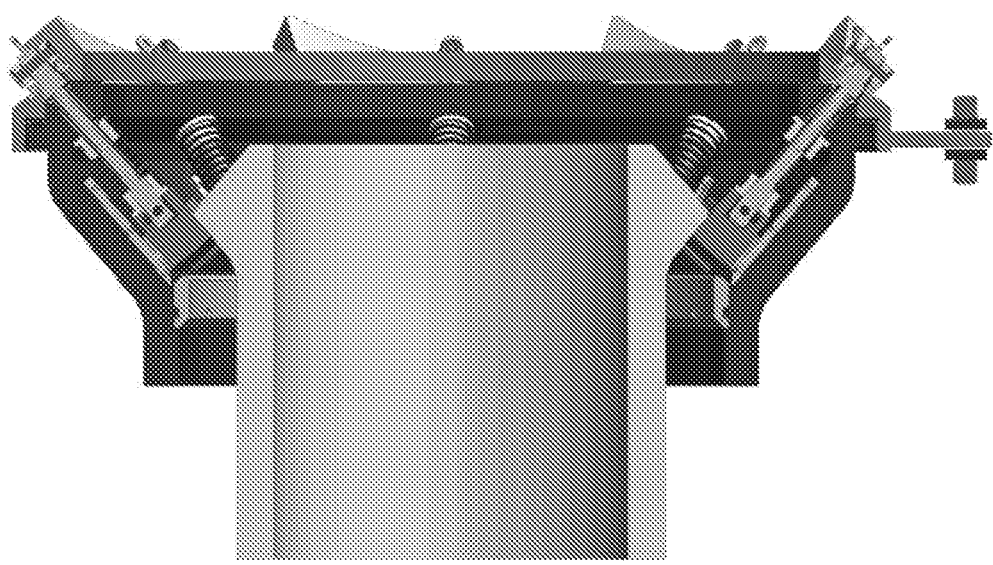
FIG. 9, which illustrates the HOA being positioned on the wedges, this being the working position, in pull-in operation.
Figure 10:
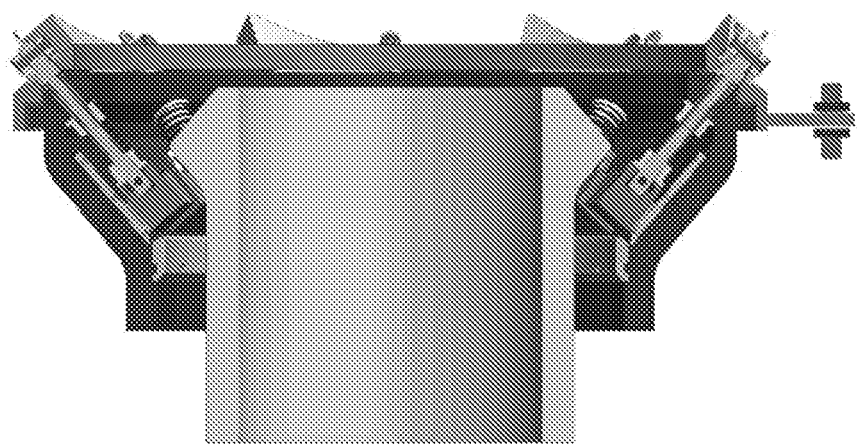
FIG. 10, which illustrates the elevation of the HOA by the pull-in winch cable, in pull-out operation.
Figure 11:
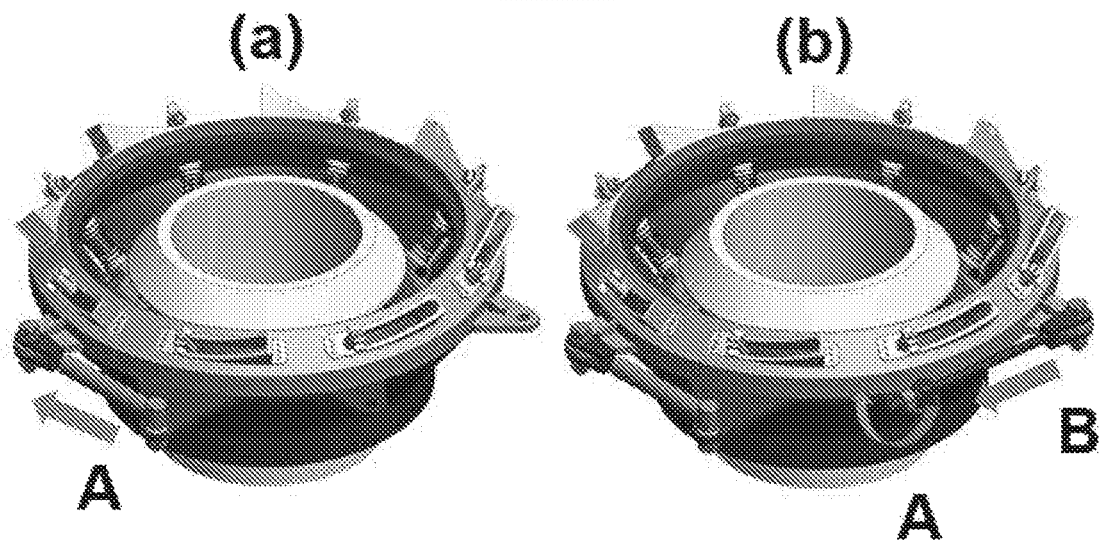
FIG. 11, which illustrates the driving of the automated retraction mechanism of the wedges through the hydraulic actuator (a), or by ROV (b), in pull-out operation.
Figure 12:
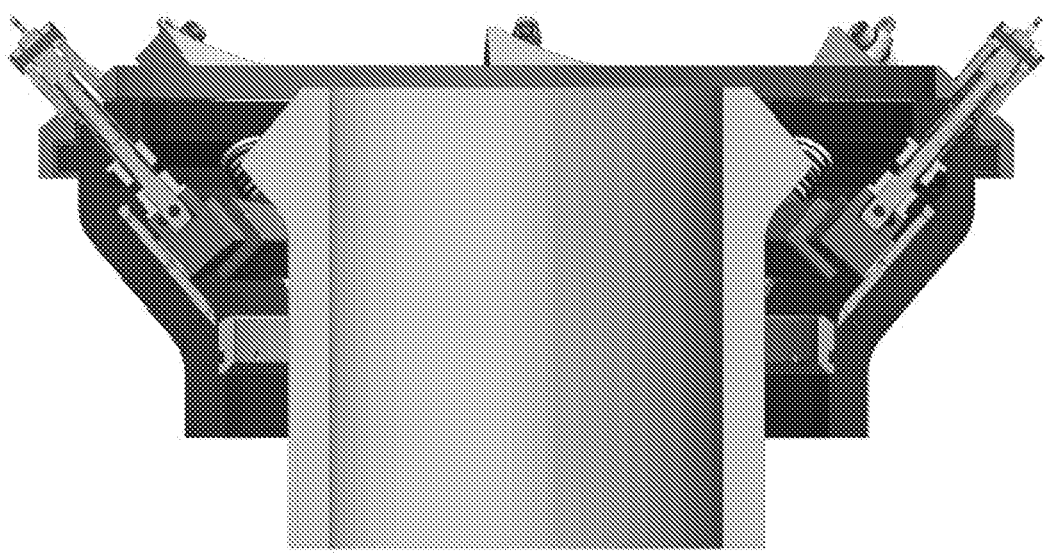
FIG. 12, which illustrates the movement of the wedges to the retracted position, in pull-out operation.
Figure 13:
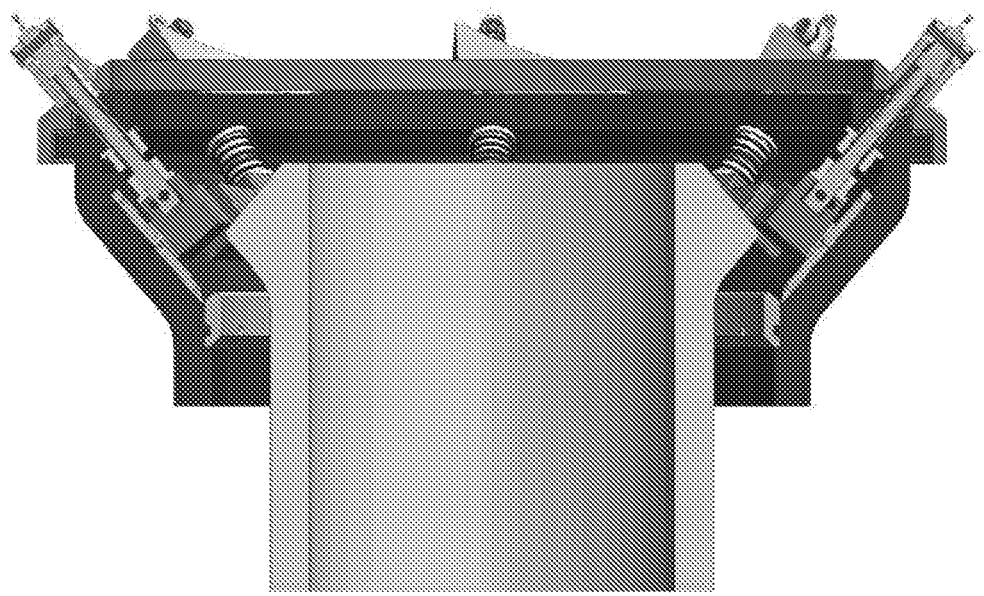
FIG. 13, which illustrates the HOA being able to be lowered and consequently removed from the upper cone, in pull-out operation.
Figure 13:
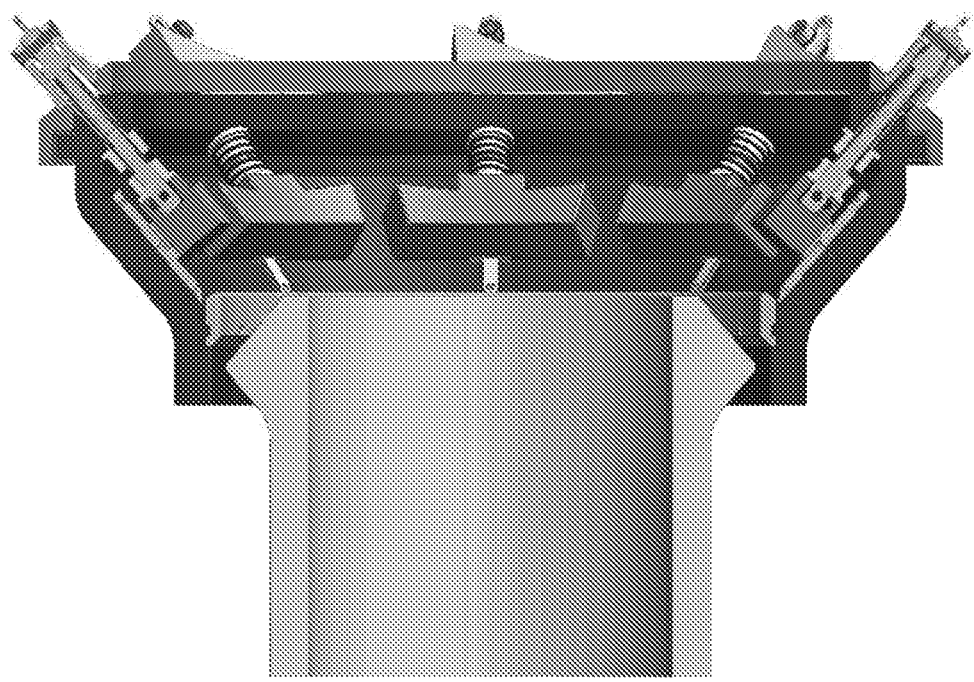

FIG. 5 illustrates the system with the wedges retracted for testing and cleaning, during pull-in operation.

The sequence from FIG. 6 to FIG. 9 summarizes the pull-in activity with the aid of the automated movement system of the wedges. The sequence from FIG. 10 to FIG. 13 summarizes the pull-out activity with the aid of the automated movement system of the wedges.

The invention claimed is:

1. A support automation for a rigid riser, comprising: a cam holder crown, rods with rollers, a drive spindle, and springs, and a hydraulic actuator;

the support automation having two actuation modes:
remotely through the hydraulic actuator driven by a panel installed in an SPU, and through the spindle driven locally by a remotely operated vehicle (ROV);
wherein the local driving by the ROV is carried out through a suitable interface that rotates the spindle, transferring torque to the cam holder crown, which in turn rotates clockwise around a longitudinal axis of the cam holder crown.

2. The support automation for the rigid riser according to claim 1, wherein the cams mounted on the crown transferring the rotation to the translation of the rods by the movement of the rollers on the cams, opening wedges and unlocking an HOA.

3. The support automation for rigid riser according to claim 1, wherein the hydraulic actuator is driven through the translational movement of the actuator, transferring torque to the cam holder crown, which in turn rotates clockwise around a longitudinal axis of the cam holder crown, transferring the rotation to the translation of the rods through the movement of the rollers on the cams, opening wedges and unlocking an HOA.

4. A support automation for a rigid riser comprising:
a cam holder crown, a drive spindle, and a hydraulic actuator;
the support automation actuated:
remotely through the hydraulic actuator driven by a panel installed in an SPU, and
through the spindle driven locally by a remotely operated vehicle (ROV),
wherein the local driving by the ROV is carried out through an interface that rotates the spindle, transferring torque to the cam holder crown which rotates clockwise around a longitudinal axis of the cam holder crown.

5. The support automation of claim 4 further comprising springs and rods with rollers.

6. The support automation of claim 5, wherein cams mounted on the crown transferring the rotation to the translation of the rods by the movement of the rollers on the cams, opening wedges and unlocking an HOA.

7. The support automation of claim 5, wherein the hydraulic actuator is driven through the translational movement of the actuator, transferring torque to the cam holder crown, which in turn rotates clockwise around a longitudinal axis of the cam holder crown, transferring the rotation to the translation of the rods through the movement of the rollers on the cams, opening wedges and unlocking an HOA.

* * * * *